(No Model.) 7 Sheets—Sheet 1.

J. R. LITTLE.
MECHANISM FOR MANUFACTURING METAL WHEELS.

No. 334,250. Patented Jan. 12, 1886.

Witnesses:
Ed. A. Newman.
Jas. E. Hutchinson.

Inventor.
Jas. R. Little, by
Pindle & Russell, his Attys.

N. PETERS, Photo-Lithographer, Washington, D. C.

(No Model.) 7 Sheets—Sheet 2.
J. R. LITTLE.
MECHANISM FOR MANUFACTURING METAL WHEELS.
No. 334,250. Patented Jan. 12, 1886.
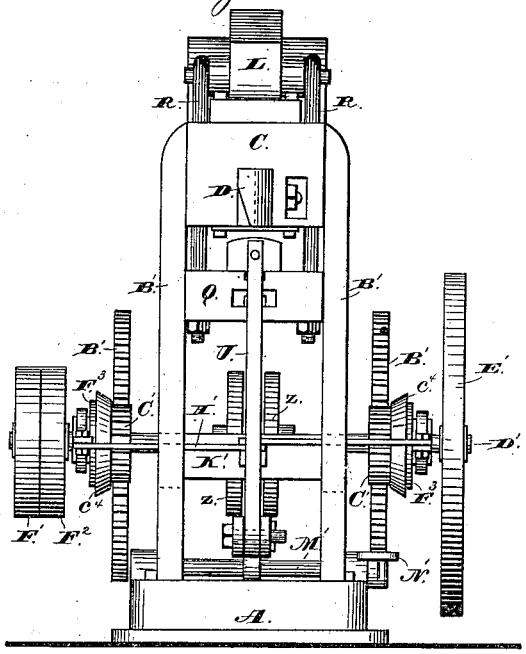
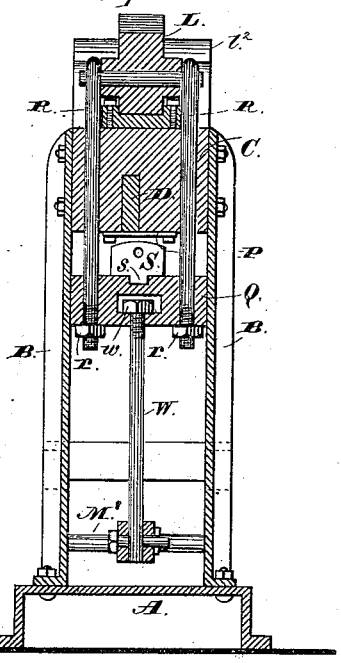
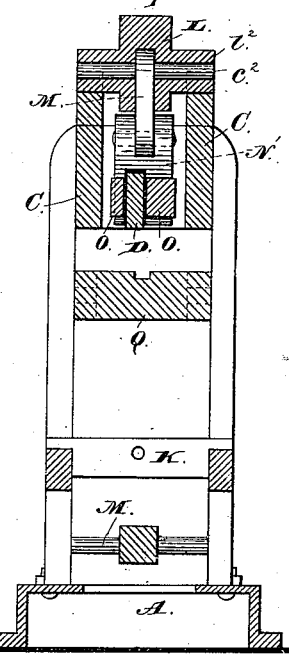

(No Model.) 7 Sheets—Sheet 3.

J. R. LITTLE.
MECHANISM FOR MANUFACTURING METAL WHEELS.

No. 334,250. Patented Jan. 12, 1886.

Witnesses:
Jas. E. Hutchinson.
Ed. A. Newman.

Inventor:
Jas. R. Little, by
Prindle & Russell, his Attys

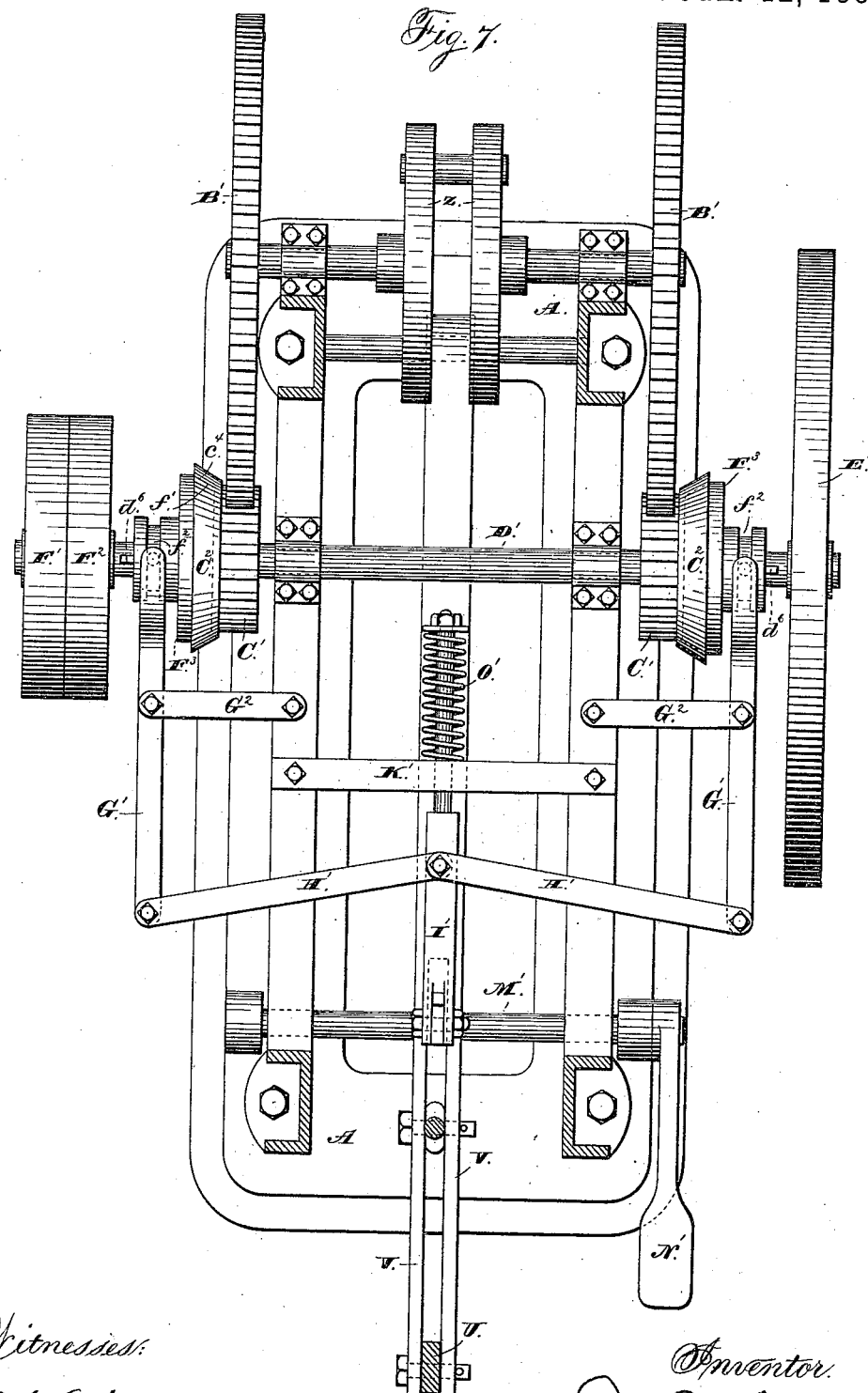

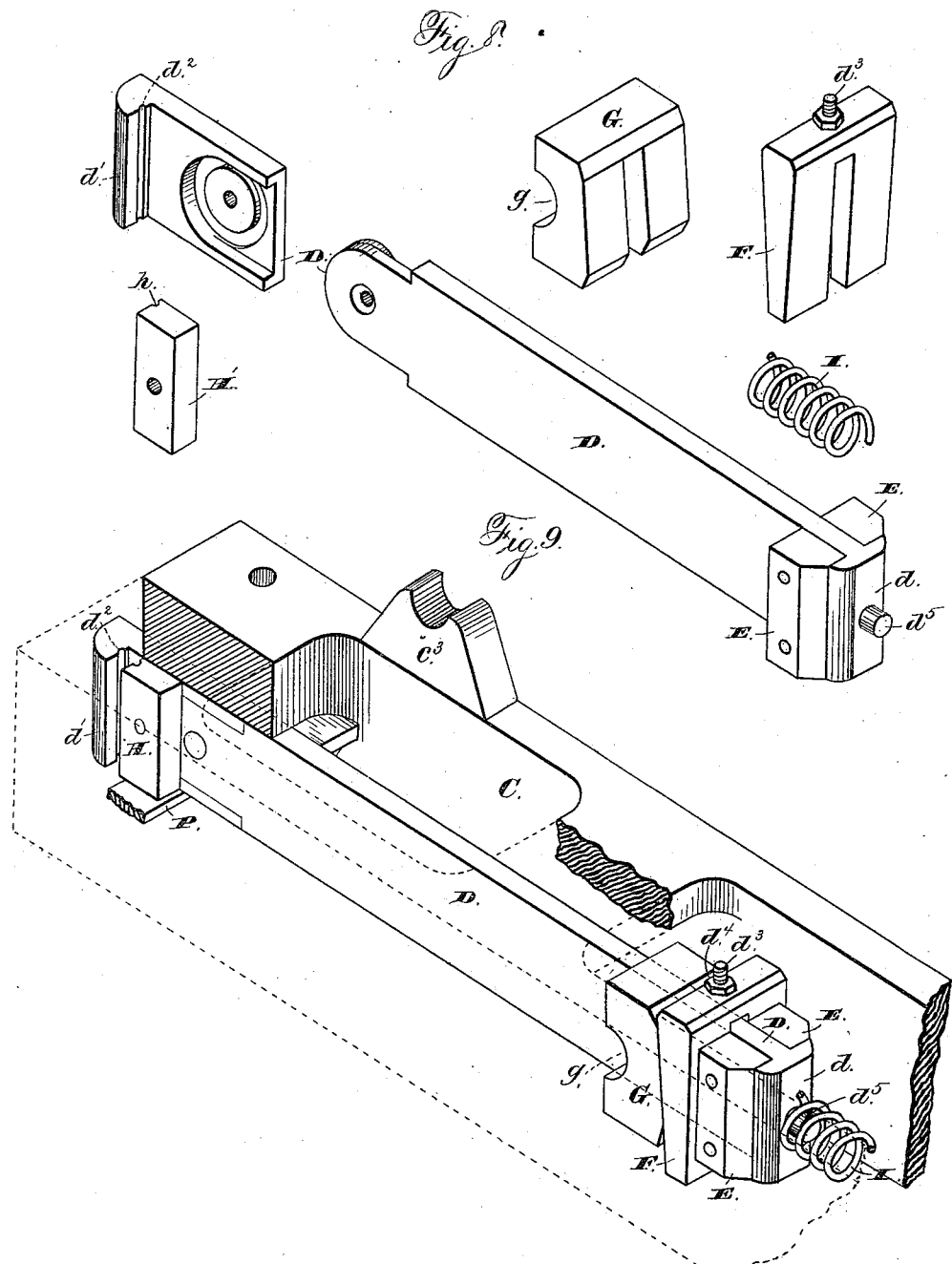

(No Model.)  
J. R. LITTLE.  
MECHANISM FOR MANUFACTURING METAL WHEELS.  
No. 334,250. Patented Jan. 12, 1886.

(No Model.) 7 Sheets—Sheet 7.

J. R. LITTLE.

MECHANISM FOR MANUFACTURING METAL WHEELS.

No. 334,250. Patented Jan. 12, 1886.

Witnesses:
Ed. A. Newman
Jas. E. Hutchinson.

Inventor.
Jas. R. Little, by
Prindle and Russell, his Attys.

N. PETERS, Photo-Lithographer, Washington, D. C.

United States Patent Office.

JAMES R. LITTLE, OF QUINCY, ILLINOIS, ASSIGNOR, BY MESNE ASSIGNMENTS, TO THE QUINCY METAL WHEEL COMPANY, OF SAME PLACE.

MECHANISM FOR MANUFACTURING METAL WHEELS.

SPECIFICATION forming part of Letters Patent No. 334,250, dated January 12, 1886.

Application filed June 2, 1884. Serial No. 133,599. (No model.)

*To all whom it may concern:*

Be it known that I, JAMES R. LITTLE, of Quincy, in the county of Adams, and in the State of Illinois, have invented certain new and useful Improvements in Mechanism for Manufacturing Metal Wheels; and I do hereby declare that the following is a full, clear, and exact description thereof, reference being had to the accompanying drawings, in which—

Figure 1:
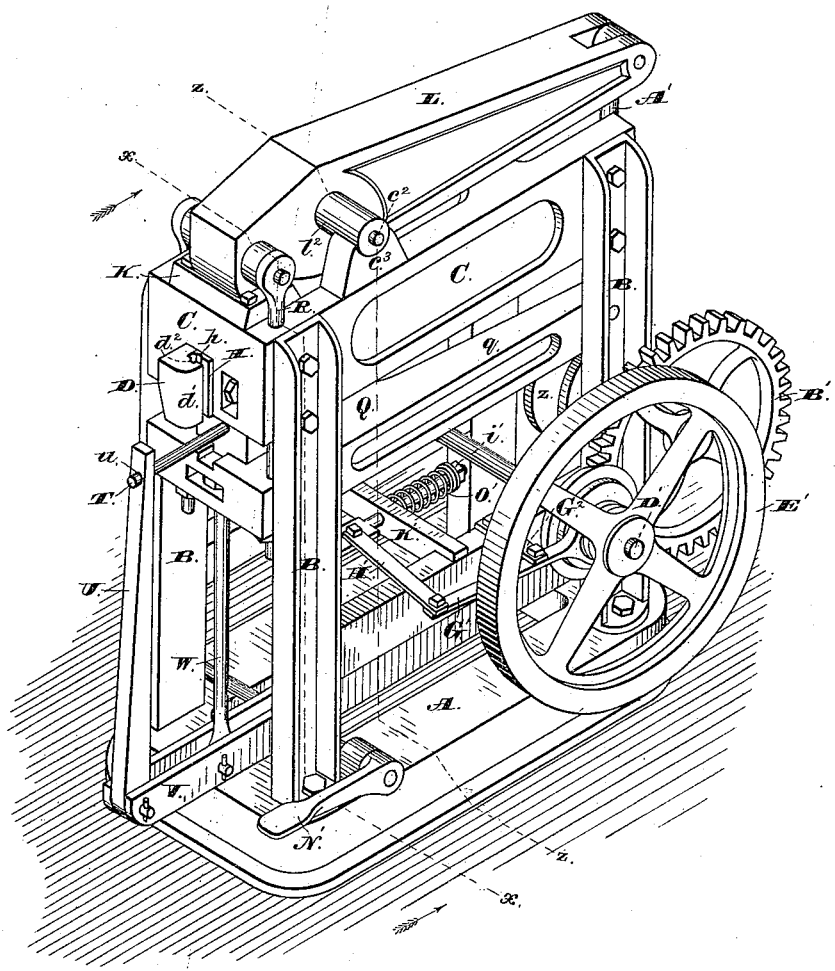
Figure 5:
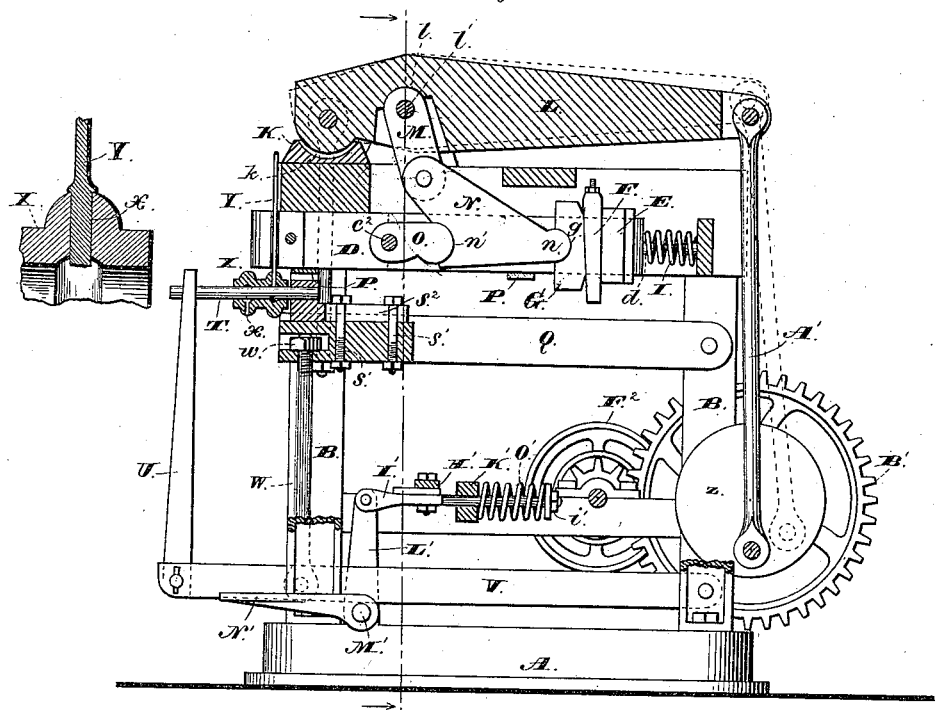
Figure 6:
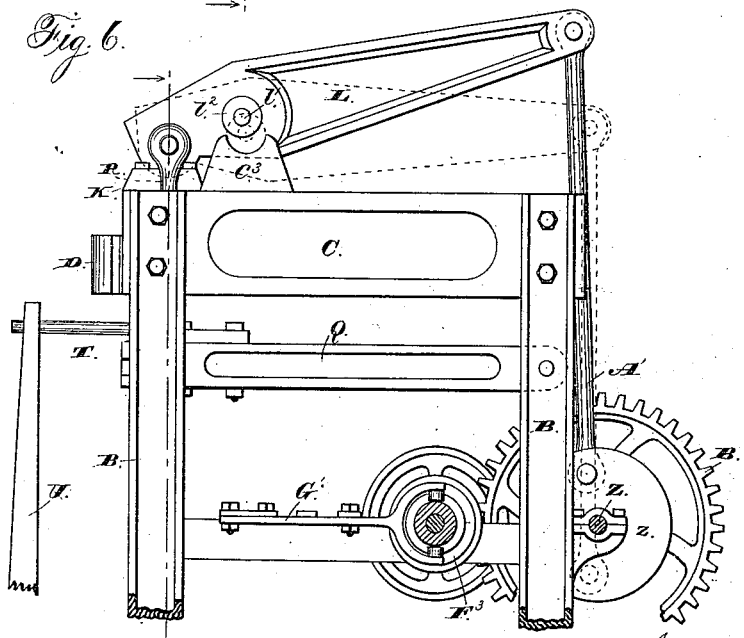
Figure 10:
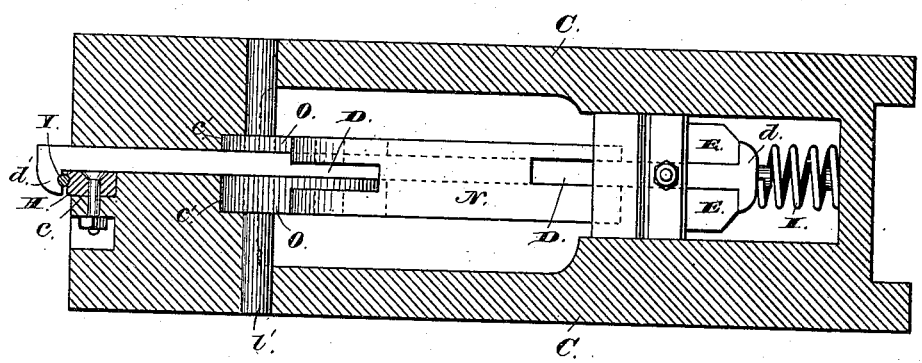
Figure 11:
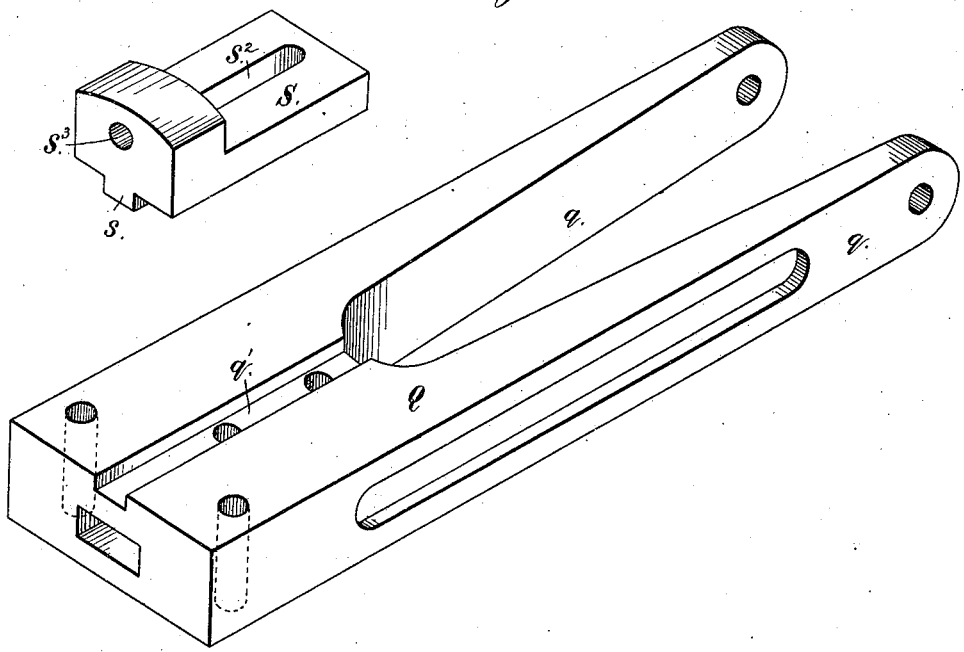
Figure 12:
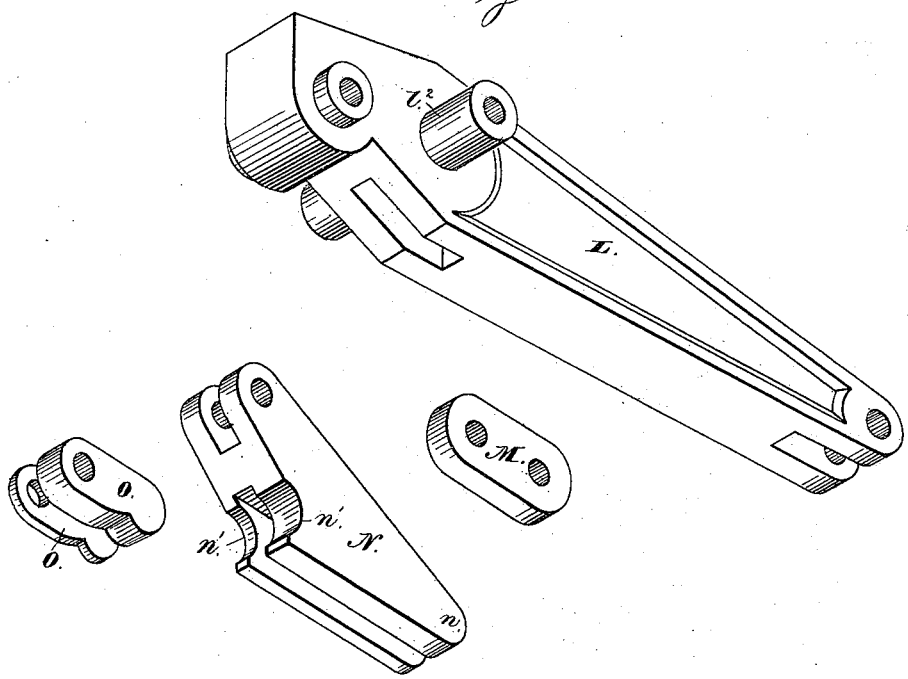
Figure 13:
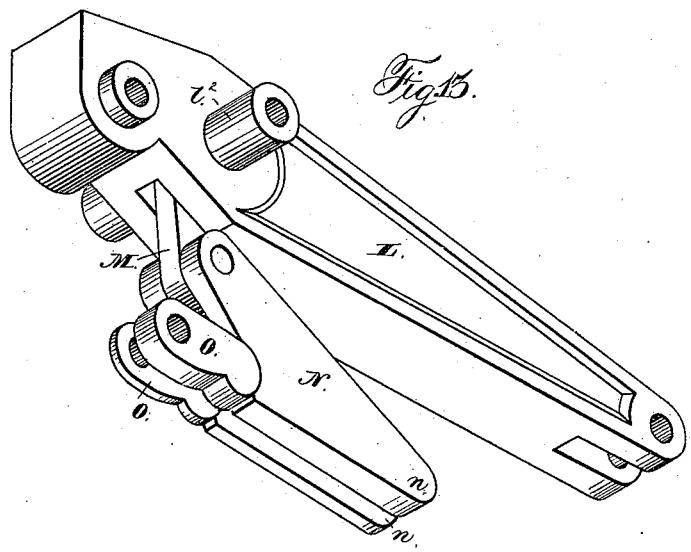

Figure 1 is a perspective view of my machine complete and ready for use. Fig. 2 is a front elevation of the same. Figs. 3 and 4 are vertical transverse sections upon lines $x\ x$ and $z\ z$ of Fig. 1. Fig. 5 is a vertical central section of the same upon a line passing from front to rear, with a detail view of a spoke secured within the hub. Fig. 6 is a side elevation of said machine, the operative parts being shown in position opposite to those seen in Fig. 5. Fig. 7 is an enlarged plan view of the mechanism employed for connecting the operative parts with the driving-shaft. Fig. 8 is an enlarged perspective view of the fixed and movable portions of the clamping-bars separated from each other. Fig. 9 is a like view of the same united. Fig. 10 is an enlarged horizontal section of said clamping-bars as arranged for the reception of a wheel-spoke. Fig. 11 is an enlarged perspective view of the frame for supporting and lifting the compressing-mandrel separated from the other parts. Fig. 12 is a like perspective view of the parts employed for operating the clamping mechanism separated from each other, and Fig. 13 is a perspective view of the same united.

Letters of like name and kind refer to like parts in each of the figures.

My invention is intended for use in uniting the spokes and hub of a metal wheel; and to this end it consists, principally, in a mechanism in which are combined elements that operate in the manner and order named to secure a spoke within a hub, substantially as herein specified.

It consists, further, in the means employed for clamping the spoke and holding the same in position for the action of the longitudinal compressing mechanism, substantially as and for the purpose hereinafter shown.

It consists, further, in the means employed for automatically opening and closing the clamping mechanism, substantially as and for the purpose hereinafter set forth.

It consists, further, in the means employed for adjusting the pressure of the clamping-jaws upon the spoke, substantially as and for the purpose hereinafter shown and described.

It consists, further, in the means employed for supporting the wheel in position for the operation of the compressing mechanism, substantially as and for the purpose hereinafter specified.

It consists, further, in the means employed for supporting the ends of the compressing-mandrel and for moving the same vertically, substantially as and for the purpose hereinafter shown.

It consists, further, in the means employed for compressing the inner portion of the spoke longitudinally, substantially as and for the purpose hereinafter set forth.

It consists, further, in the means employed for operating the compressing mechanism, substantially as and for the purpose hereinafter shown and described.

It consists, further, in the means employed for regulating the amount of longitudinal compression of the spoke, substantially as and for the purpose hereinafter specified.

It consists, finally, in the means employed for connecting the driving-shaft with and disconnecting it from the operative mechanism, substantially as and for the purpose hereinafter shown.

In the annexed drawings, A represents the base of my machine, from or near the corners of which four parts, B, extend vertically upward, and at their upper ends are united by means of a hollow, generally rectangular, block, C, that is placed between said ends, and the latter bolted to its sides. The block C has interiorly the form shown in Fig. 10, and within the same is placed a wrought-iron or steel bar, D, that, as shown in Fig. 8, has in cross-section a rectangular form, at its rear end is provided with a T-shaped head, $d$, and at its front end has a lateral projection, $d'$, which has substantially a right angle to the line of said bar, and within its inner face is provided with a vertical half-round groove, $d^2$.

Secured upon each side of the bar D, immediately in front of the head $d$, is a cast-metal block, E, which has a vertical front face that is arranged at a right angle to the line of said bar, and in front of said blocks, and spanning said bar, is a bifurcated wedge, F, which has a vertical rear face and a rearward and downward inclining front face. Said wedge is held in place and adjusted to vertical position by means of a stud, $d^3$, which is secured within and projects from said bar D upward through the central part of said wedge, and has upon its upper threaded portion a nut, $d^4$. Immediately in front of said wedge F is a bifurcated block, G, that in like manner spans said bar D, and has within its front side a half-round recess, $g$, and at its rear side conforms to the inclination of the contiguous face of said wedge.

The blocks E are for the purpose of giving sufficient breadth of bearing for the wedge F, and the latter and the block G have such lateral dimensions as to cause them to loosely fill the space at such point between the side walls of the block C. The opening for the passage of the bar D, at or within the front portion of said block C, is just sufficient in size to permit said bar to move lengthwise freely through the same. Said bar is located at one side of the transverse center of said block C, in order that the half-round groove $d^2$ may come exactly in line with such center.

The block C is constructed from cast metal, and within its front end, immediately in rear of the projection $d'$ of the bar D, is provided a recess, $c$, that receives and contains a steel block, H, which is secured therein in any suitable manner, and within its front end has a vertical half-round groove, $h$, that corresponds in size to and coincides in position with the like groove, $d^2$, of said projection $d'$. The projection $d'$ and block H form the jaws used for clamping a spoke in the manufacture of my wheel, and are opened and closed by the longitudinal movement of the bar D. The outward movement of said bar is effected by means of a spiral spring, I, which is placed between the rear end of the latter and the rear end of the recessed center of the block C, and is held in place by a stud, $d^5$, that projects from said bar rearward into said spring, while the closing together of said jaws by an inward movement of said bar D is effected by the following-described mechanism:

Secured upon the front end, at the upper side of the block C, is a block, K, which is provided in its upper face with a semicircular recess, $k$, that forms a support for and receives the correspondingly-shaped front end of a lever, L, and constitutes for the same a pivotal bearing. From the bearing $k$ said lever L extends rearward, and has connected with its rear end mechanism, hereinafter described, for moving the same vertically.

Pivoted at one end, within a recess, $l$, formed in the lower side near the front end of the lever L, by means of a transverse bolt, $l'$, is a link, M, which from thence extends downward to and is pivoted upon one end of a toggle-bar, N. Said toggle-bar is bifurcated longitudinally to enable its rear portion to span the clamping-bar D, and has the ends $n$ of its rear divided part contained within the recesses $g$ of the block G, while within its front portion, below the pivotal connection of said link M, are formed two coinciding half-round bearings, $n'$, that correspond to said recesses $g$.

Between each of the bearings $n'$ and a similar bearing, $c'$, which is formed within the front inner portion of the block C, extends a toggle-bar, O, that at its front end is pivoted to said block by means of a transverse pin, $c^2$; but at its rear end is, like the rear ends, $n$, of the toggle-bar N, held in engagement with its bearing by the forward pressure of the spring I. As thus arranged, by depressing the rear end of the lever L the toggle-bars N and O will be moved into a line with each other, and will force the clamping-bar D rearward, so as to close together the clamping-jaws $d'$ and H and clasp between the same the spoke of a wheel. By means of the vertical adjustment of the wedge-block F the pressure of said jaws upon said spoke may be varied at will. Said clamping-bar D is supported in vertical position by means of two metal plates, P, which are placed transversely across the lower open side, near the front and rear ends of the frame block C, and form bearings upon which said bar moves.

A short distance below the block C is a bar, Q, which in plan view has substantially the same exterior size and shape, and by means of a V-shaped notch that extends from its rear end forward beyond its longitudinal center has its rear portion divided into two arms, $g$, each of which is pivoted to the contiguous rear post, B, the arrangement being such that the front end of said bar is free to be moved vertically between the front posts, B. The front end of the bar Q is supported by means of two rods, R, one of which is pivoted at each side to the front end of the lever L, and from thence passes downward through the block C and through said bar, and is provided upon its lower projecting threaded end with one or more nuts, $r$, by turning which latter the vertical position of said bar at such point may be varied at will. The upper face of the bar Q is provided at its transverse center with a longitudinal groove, $g'$, and upon said face is placed a block, S, that has upon its lower side a tongue, $s$, which fits into said groove, and enables said block to be moved lengthwise of said bar, while held in a central position transversely. Two screws, $s'$, passing through a longitudinal slot, $s^2$, in said block S downward into said bar, operate to hold the former in position upon the latter, and permit of such adjustment of said block toward or from the front of the machine, as may be desired.

Within the front higher portion of the block S is an opening, $s^3$, which extends horizontally inward in a line with the longitudinal axis of the bar Q, and receives and contains one end of a steel mandrel, T, that is preferably round, and has such diameter as to enable it to readily pass through the axial opening of hub of the wheel to be operated upon. The outer end of said mandrel is supported within and passes through the upper end of a bar, U, which extends vertically downward, and has its lower end pivoted between the ends of two parallel bars, V. The bars V are pivoted at their rear ends upon the rear posts, B, or upon their contiguous parts of the frame, and from thence extend horizontally forward, and at a point in line with the front posts, B, are pivoted to the lower end of a rod, W, which at its upper end is connected with the front portion at the transverse center of the bar Q. This arrangement causes the relative positions of the bars Q and V to be maintained as the front end of the former is raised or lowered, and also causes the supporting-bar U and mandrel T to maintain their relations under such changes of positions. In order that said bar V may be adjusted vertically with relation to said bar Q, so as to bring the opening $u$ in said supporting-bar U exactly into line with said mandrel, the upper end of the rod W is threaded and passes through a nut, $w$, in a recess in said bar, Q, so that by turning said nut said rod will be correspondingly drawn upward or lowered.

The pivoting of the lower end of the supporting-bar U enables the upper end of the same to be turned forward and downward away from the mandrel T whenever it is desired to place a wheel-hub upon the latter, and after such hub is in place said bar is again turned upward to and caused to engage with said mandrel and to furnish therefor the needed outer support.

In the use of my machine, a wheel-hub, X, provided with suitable radial openings or mortises, $x$, is placed upon the mandrel T. A spoke, Y, is placed within the uppermost of said mortises with its lower end resting upon said mandrel and its body immediately above said hub contained between the jaws $d'$ and H, after which said jaws are by a downward motion of the lever L caused to close firmly upon said spoke, and said mandrel is then raised until that portion of said spoke below said jaws is compressed longitudinally, and not only caused to fill said mortise, but also to form an enlargement at the outer end of the same.

The upward motion of the mandrel T is effected by means of two trunnions, $l^2$, which are arranged upon opposite sides of the lever L at the point where the bolt $l'$ is located, and two bearing-lugs, $c^3$, that extend upward from the block C in proper position to receive and engage with said trunnions when said lever has moved downward sufficiently to close the jaws $d'$ and H. Before the trunnions $l^2$ are seated in the bearings $c^3$ the lever L moves upon the pivotal bearing-block K, and the lifting-rods R, being pivoted at the pivotal center of said lever, do not change position; but after said trunnions are seated in their said bearings the former become the pivotal fulcrums of said lever, and the further downward motion of the rear end of the latter causes its front end to rise, and said lifting-rods, the bar Q, the mandrel T, and their connecting parts to be correspondingly moved upward. As the connection of the link M with the lever L is at the axial center of the trunnions $l^2$ the motion of said lever, while said trunnions are seated in their bearings $c^3$, does not move said link or change the relative positions of the toggle-bars and other portions of the clamping mechanism, the latter being actuated to clamp a spoke before said trunnions are seated, and to release said spoke after the latter rise from out of their bearings, which last operation occurs after the front end of said lever L has moved downward into contact with the bearing-block K.

In order that the front portion of the clamping-bar D, upon which is thrown all of the wear, may be readily changed for different sizes of spokes, or replaced if broken, it is connected with the rear portion or body of said bar by means of an interlocking lap-joint, as shown in Fig. 8, and through the engaging ends is passed a bolt that has its head and point flush with the sides of said bar.

The operative mechanism is driven by the following described means, viz: Journaled horizontally upon the sides, near the lower ends of the rear posts, B, is a shaft, Z, that at or near its longitudinal center is provided with a crank, $z$, upon which is journaled one end of a pitman, A', that from thence extends upward to and is journaled upon the rear end of the lever L, and by the rotation of said shaft operates to give to said lever the vertically-reciprocating motion required. Upon each end of the shaft Z is secured a gear-wheel, B', which meshes with and receives motion from a pinion, C', that is journaled upon a shaft, D', which shaft is journaled in front of and parallel with said shaft Z, and upon one end is provided with a balance-wheel, E', and upon its opposite end with a fast and a loose belt-pulley, F' and $F^2$, respectively. Each pinion C' is provided upon its outer face with a metal disk, $C^2$, within which is formed a concave recess, $c^4$, that is adapted to receive the corresponding face, $f'$, of a clutch, $F^3$. Said clutch is connected with the shaft D' by means of one or more longitudinal feathers, $d^6$, so as to be capable of sliding lengthwise of said shaft while compelled to rotate therewith, and when moved into engagement with said disk $C^2$ operates by the friction between the concave and convex faces $c^4$ and $f'$, respectively, to compel said pinion to rotate in the same direction. Each clutch $F^4$ is moved into or out of engagement with its pinion by means of a horizontal lever, G', which is pivoted centrally upon a suitable pivoted support, G², and has its rear forked end in engagement with a circumferential groove, $f^2$, that is provided in the periphery of said clutch. The front end of each lever G' has pivoted thereto one end of a bar, H', which from thence extends inward, and has its opposite end pivoted upon a horizontal bar, I', that is placed at the transverse center of the machine. The rear portion of the bar I' is contained within and adapted to slide longitudinally through a suitble guide, K', while its front end is pivoted upon the outer end of an arm, L', which extends radially upward from a horizontal transversely-journaled shaft, M'. Said shaft is provided at one end with a foot-lever or treadle, N⁴, which extends horizontally forward in convenient position for use by the operator for moving said bar I' forward and throwing the clutches F⁴ into engagement with the pinion C', while around the rear projecting portion of said bar I' is placed a spiral spring, O, that is compressed longitudinally between the guide K' and a nut, $i'$, upon the rear end of said bar, and operates to hold said clutches with a yielding pressure out of engagement with said pinions.

In using the machine, the operator first turns outward and downward the support for the outer end of the mandrel, places a hub upon the latter, and then replaces said support in position. He next places a spoke in the uppermost mortise of said hub and moves said spoke between the clamping-jaws, and then, placing his foot upon the treadle, starts the operative parts, when the clamping-jaws close upon and firmly clasp the spoke. The mandrel then rises and compresses the lower portion of the latter and then returns to its normal position, and said clamping-jaws then open to release said spoke and permit of a repetition of the operation described.

I do not claim jaws for clamping a spoke immediately outside of a hub, in combination with a lever or equivalent device to enter the interior of said hub and impinge upon the end of said spoke to form thereon a rivet-head.

Having thus fully set forth the nature and merits of my invention, what I claim is—

1. A mechanism in which are combined elements that operate in the following order, viz: a mandrel which is adapted to pass axially into a wheel-hub and support the same in position to receive within a radial mortise the inner end of a spoke, means whereby said spoke may then be clamped at a point near the periphery of said hub, and means whereby said mandrel may then be moved toward said clamping mechanism, and said spoke thereby compressed longitudinally from its inner end to the point where it is clamped, substantially as and for the purpose specified.

2. In combination with the bar D, provided with the clamping-jaw $d'$ $d^2$, the toggle-bar N, having its rear end pivoted to or upon said bar D, the toggle-bars O, pivoted at their front ends within a fixed bearing at their rear ends within the front end of said toggle-bar D, the spring I, operating to hold said bar at the front limit of its motion, and means whereby said toggle-bar D may be moved vertically, substantially as and for the purpose set forth.

3. In combination with the clamping-bar D and the toggle-bars N and O, the bifurcated block G, adapted to slide lengthwise of said bar and provided with bearings $g$, and the wedge F, which is fitted between the rear face of said bearing-block and a fixed block, E, upon said bar, and is adapted to be adjusted to and secured in vertical position, substantially as and for the purpose shown and described.

4. In combination with the bar D, adapted to be moved longitudinally within its bearings, and with the clamping-jaws $d'$ $d^2$ and H $h$, the spring I, the toggle-bars O and N, the link M, the lever L, the shaft Z, provided with the crank $z$, and the pitman A', substantially as and for the purpose specified.

5. In combination with a horizontally-arranged mandrel which is adapted to receive and support a wheel-hub and to be moved upward toward spoke-clamping mechanism, a pivoted bar for supporting its outer end that is adapted to be engaged with and disengaged from said end, and when thus engaged and furnishing support is moved vertically with said mandrel, substantially as and for the purpose shown.

6. The combination of the horizontal pivoted bar Q, provided with the block S and mandrel T, the horizontal bars V, pivoted at their rear ends and having pivoted to their front ends the supporting-bar U, and the rod W, extending between and connecting the front portions of said bars V with said block S, whereby the relative positions of said mandrel and supporting-bar are maintained as the former is moved vertically, substantially as and for the purpose set forth.

7. The combination of the horizontal bar Q, pivoted at its rear end, and provided at its front end with the mandrel T, the lever L, having the trunnions $l'$ and adapted to oscillate within the bearings $c^3$, and the lifting-rods R, pivoted upon the front end of said lever, and secured within or to the front portion of said bar, substantially as and for the purpose specified.

8. In combination with the bar Q, pivoted at its rear end upon the frame, and with the lever L, which is adapted to oscillate upon the trunnions $l'$, the lifting-rods R, pivoted at their upper ends upon the front end of said lever, and having their lower threaded ends passed through said bar, and provided below the same with nuts $r$, substantially as and for the purpose shown.

9. In combination with the shaft D', provided with the concave-faced disks $C^2$, the convex-faced clutches $F^2$, adapted to rotate with and to slide lengthwise of said shaft, the forked levers $G'$, the connecting-bars $H'$, the bar $I'$, adapted to move lengthwise and held at the rear limit of its motion by the spring $O'$, the shaft $M'$, provided with the radial arm $L'$, and treadle $N'$, said parts being arranged so that a downward movement of said treadle will cause said clutches to engage with said disks, substantially as and for the purpose set forth.

In testimony that I claim the foregoing I have hereunto set my hand this 7th day of April, A. D. 1884.

JAMES R. LITTLE.

Witnesses:
F. M. McCANN,
JOHN W. RICKART.